(12) United States Patent
Salmento

(10) Patent No.: US 8,210,200 B2
(45) Date of Patent: Jul. 3, 2012

(54) FLOW REGULATOR DEVICE

(75) Inventor: John S. Salmento, Nazareth, PA (US)

(73) Assignee: FLSmidth A/S (DK)

( * ) Notice: Subject to any disclaimer, the term of this patent is extended or adjusted under 35 U.S.C. 154(b) by 343 days.

(21) Appl. No.: 12/002,394

(22) Filed: Dec. 17, 2007

(65) Prior Publication Data

US 2009/0151800 A1 Jun. 18, 2009

(51) Int. Cl.
*F16K 31/36* (2006.01)
(52) U.S. Cl. .................. 137/495; 137/504; 137/508
(58) Field of Classification Search ............ 137/504, 137/495, 508
See application file for complete search history.

(56) References Cited

U.S. PATENT DOCUMENTS

| | | | | |
|---|---|---|---|---|
| 331,622 A | 12/1885 | Fales | | |
| 829,669 A | * 8/1906 | Porter | ............... | 137/504 |
| 1,563,378 A | * 12/1925 | Knauss | ............... | 137/220 |
| 1,579,251 A | * 4/1926 | Schossow | ............... | 137/504 |
| 2,116,912 A | 5/1938 | Richardson | | |
| 3,151,628 A | * 10/1964 | Heckert | ............... | 137/504 |
| 3,381,708 A | * 5/1968 | Chenoweth | ............... | 137/504 |
| 3,590,861 A | * 7/1971 | Chittenden et al. | ............... | 137/501 |
| 4,147,298 A | 4/1979 | Leemhuis | | |
| 4,648,424 A | * 3/1987 | Takahashi et al. | ............... | 137/504 |
| 4,881,572 A | 11/1989 | Bengtsson | | |
| 5,188,668 A | 2/1993 | Litka et al. | | |
| 6,082,021 A | 7/2000 | Fons et al. | | |

OTHER PUBLICATIONS

International Search Report dated Apr. 3, 2009, 4 pages.

* cited by examiner

*Primary Examiner* — William McCalister
(74) *Attorney, Agent, or Firm* — Daniel DeJoseph; Aaron M. Pile; Jeffrey A. Sharp

(57) ABSTRACT

A fluid flow regulator of the present invention comprises in combination a stationary hollow duct housing having a first end and a second end through which fluid flows. The device also incorporates a movable member aligned concentric with the duct having an end essentially similarly shaped and sized to the first end of the housing. The member may be spaced apart from the duct so that fluid can enter the duct housing through an opening defined by the space between the end of the member and the first end of the duct, with the movement of the member serving to change the size of opening. The movement of the member is controlled by the movement of a float located within the duct. The position of the float can be preset by the operator of the invention so that when fluid flow into the duct is at a predetermined amount the float will remain stationary, and when the fluid flow increases above such predetermined level the float will be moved in the direction of the fluid flow and when fluid flow into the duct is below said predetermined amount, the float will move the member opposite the direction of fluid flow.

8 Claims, 3 Drawing Sheets

FLOW REGULATOR DEVICE

BACKGROUND OF THE INVENTION

The present invention relates to a flow regulator device that may be utilized in varied applications.

In one application, the device of the present invention can be utilized in the process of cooling a bed of particulate material, such as cement clinker in a grate cooler, in which cooling gas from a source such as a fan is directed, via one or more ducts or channels, up through a gas distribution bottom that supports the bed of material to be treated and the bed of clinker material from one or more underlying compartments. In such a cooler the clinker is not always uniformly distributed on the cooler grate. Instead, the size and amount of the clinker to be cooled can be irregularly distributed on the cooler and the thickness of the clinker bed may exhibit variations both longitudinally and transversely through the cooler, which results in differing pressure drops through the clinker bed at different points throughout the cooler. Without a flow regulator, those areas in which there are lower pressure drop through the clinker bed—that is, those areas that have lightly packed, small amounts of clinker—will attract maximum amounts of cooling air and vice versa. Thus flow regulators are desirable to compensate for irregularities in clinker distribution throughout a clinker cooler.

In U.S. Pat. No. 6,082,021 there is described a means for self regulating the flow of the treatment gas through each duct of a gas distribution bottom by having a flow regulator provided in each duct to thereby reduce the total pressure loss across the gas distribution bottom and to distribute the flow of the treatment gas through the material bed. The flow regulator described in this patent senses changes in static pressure above, and adjusts its position to maintain a constant differential pressure across the grate assembly and clinker bed combination. By maintaining a constant differential pressure, the valve is able to ensure that the airflow through any one-grate assembly does not change. This regulated airflow optimizes cooler efficiency by preventing air from short-circuiting through sections of the clinker bed characterized by a lower resistance to gas flow. Another design of flow regulator is shown in Canadian patent 02550297 which comprises in part a vertically situated fluid permeable housing arranged below a cooling grate. The described flow regulator is claimed to achieve a constant airflow rate versus pressure drop.

It would be advantageous to have a flow regulator that has utility not only in applications which utilize a gas distribution bottom, such as a cement clinker cooler, fluidized bed reactor, chemical reactor, drying apparatus and gas-solid heat exchanger, but also in applications the flow regulator would not be positioned vertically, such as in wind boxes, burners or air ports in pulverized, solid fuel furnaces of power plants. The flow regulator of the present invention is particularly well suited to applications where the desired flow rate through the regulator needs to be adjustable during operation since only a single characteristic needs to be changed to achieve the desired flow rate; whereas most prior art flow regulators need to modify multiple characteristics simultaneously.

BRIEF DESCRIPTION OF THE INVENTION

The above and other objects are realized by the fluid flow regulator of the present invention which comprises in combination a stationary hollow duct housing having a first end and a second end, being adaptable to have fluid flow therethrough between such ends. The device also incorporates a movable member aligned concentric with the duct having a forward end essentially similarly shaped and sized to the first end of the housing. The member may be spaced apart from the duct so that fluid can enter the duct housing through an opening defined by the space between the forward end of the member and the first end of the duct, with the member being movable relative to the duct to change the size of the opening between a first retracted position where the size of the opening is at a maximum, a second forward position where the size of the opening into the duct, is at a minimum or is closed, and all intermediate positions. The movement of the member is controlled by the movement of a float located within the duct. The position of the float, and accordingly the position of the member relative to the duct, can be preset by the operator of the invention to be responsive to process parameters such as pressure, temperature and/or the rate of fluid flow into the flow regulator. For example, when fluid flow into the duct is at a predetermined amount the float (and accordingly the member) can be preset to remain stationary, and the opening will remain at a predetermined size. When the fluid flow increases above such predetermined level (for instance, because the pressure drop across the duct and the material bed has decreased) the float will be moved in the direction of the fluid flow, the member will accordingly move toward the second position and the size of the opening suitable for fluid flow therethrough will be decreased. Likewise, when fluid flow into the duct is below said predetermined amount, the float will move the member toward the first position and the size of the opening suitable for fluid flow therethrough will be increased.

BRIEF DESCRIPTION OF THE DRAWINGS

The invention is generally described in accordance with the following figures, which are not necessarily drawn to scale. Similar numerals depict similar elements in each figure.

DESCRIPTION OF THE INVENTION

Figure 1:
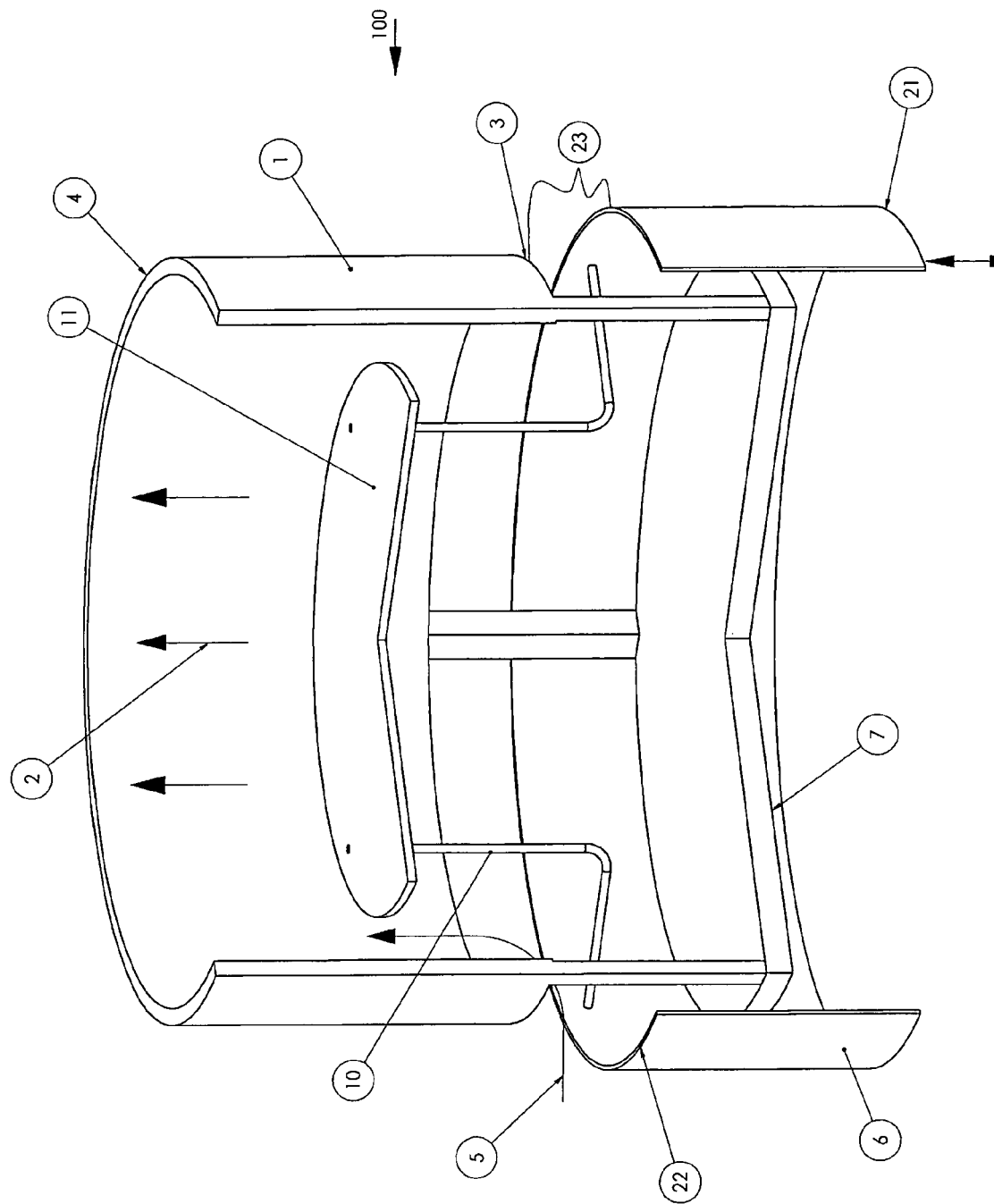
FIG. 1 shows a perspective view of one embodiment of the flow regulator of the present invention which is vertically positioned for operation, with a front wedge portion being cut away to show a view of the regulator's interior.

FIG. 1 illustrates one embodiment of the fluid flow regulator 100 of the present invention. Although fluid flow regulator 100 is at times described in the context of its use situated vertically in a clinker cooler, in which case the fluid flow is cooling air, the fluid flow regulator 100 can operate with any fluid and in other equipment and positions as described in part below.

Fluid flow regulator 100 comprises a hollow duct 1 (which, when used in a clinker cooler, is vertically situated) through which fluid is adapted to flow axially in the direction of arrows 2. Fluid enters the interior of duct 1 through the first end 3 generally at right angles to the longitudinal axis of duct 1 in the direction generally shown by arrow 5 and thereafter flows axially through the duct housing toward second end 4. Duct 1 can be made of any material that can withstand the intended application and is impenetrable to the fluid it is intended to convey. Second end 4 is adaptable to be placed underneath and/or adjacent to, as the case may be, the grate line in a clinker cooler, the combustion grate line in a stokerfired furnace, the fluid distributor in fluidized bed equipment, and other equipment in which a fluid flow regulator would have utility.

External to duct 1 is movable member 6 that is reciprocally movable in relation to duct 1 along the same longitudinal axis as duct 1. The function of the movable member is to act as a flow control valve for the device. Member 6 has lower end 21 and forward end 22, and is adapted to move back and forth between a first, fully retracted, position at which the axial distance between forward end 22 and first end 3 is at a maximum, and a second, maximum forward, position where forward end 22 is essentially adjacent to first end 3, and all positions in between. Opening 23, which serves as an entrance for fluid flow into duct 1, is formed by the space, i.e. the axial distance between first end 3 and forward end 22. Fluid will flow into duct 1 through opening 23 and then will move axially through the duct in the direction of arrow 2. The movement of member 6 either toward duct 1 (in which case the size of opening 23 will be decreased while the pressure drop across the flow regulator increases) or away from duct 1 (in which case the size of opening 23 will be increased while the pressure drop across the flow regulator decreases) corresponds to the movement of float 11. The movement of float 11 will be dictated by the force balance on the float. As float 11 moves back and forth either in or against the direction of air flow through duct 1, member 6 will also move an equivalent distance in the same direction in unison with the movement of float 11. Any suitable means can be utilized to link the movement of member 6 to the movement of float 11—FIG. 1 depicts member 6 connected to float 11 by attachment means 10 which in the depicted embodiment are connecting rods For example, wires or chains can be alternatively utilized.

The upward (or forward, i.e. in the direction of fluid flow) force on float 11 is produced by the drag force on float 11 by the flowing fluid. The weight of the float assembly (float 11, attachment means 10 and movable member 6) creates a constant downward force provided the density of the float assembly is greater than the density of fluid. The drag force on the float is a function of the float cross-sectional area impacted by the fluid, the duct's cross-sectional area and the rate of fluid flow. Therefore, there is a rate of fluid flow which produces an upward force on the float that exactly cancels the downward force on the float assembly. If duct 1's cross-sectional area is constant, the drag force across float 11 is not a function of the float height. If the airflow rate increases slightly due to a reduction in the pressure drop downstream of the flow regulator or an increase in the pressure upstream of the flow regulator, the upward force on the float assembly will be greater than the downward force. This will cause the float assembly to move upward. Conversely if the airflow rate decreases slightly due to an increase in the downstream pressure drop, the float assembly will move downward. This returns the air flow rate back to the designed value.

The maximum and minimum sizes of opening 23 can be preset by the practitioner, in accordance with factors such as air flow rate and pressure drop. For example, in the embodiment depicted by FIG. 1, member 6 will move opposite the direction of fluid flow to the point where connecting rods 10 come in contact with bottom plate 7 and in the direction of fluid flow to the point where connecting rods 10 come in contact with first end 3. The movement of member 6 (corresponding to the movement of float 11) either in or opposite the direction of fluid flow according to prevailing pressure and flow conditions (or if the float stays stationary at a constant pressure drop) will also be determined in part by factors that can be preset by the practitioner, including the shape and cross-sectional area of the float and any reciprocal force or forces, such as gravity, spring force, hydraulic force, if any, acting on the float assembly to resist movement in the float assembly or to move the assembly opposite the direction of fluid flow when the pressure drop is below a predetermined level.

As indicated, forward end 22 is substantially the same size and shape as first end 3. Thus, the size (i.e., the perimeter) of forward end 22 can be the same size as, or slightly smaller or larger than, first end 3. As depicted, duct 1 and member 6 are tubular and they have a circular cross section, but both can have any shape adaptable for fluid flow. In the embodiment depicted in the FIGS. 1-4, forward end 22 has a slightly larger diameter than first end 3, and at the maximum forward position of member 6 relative to duct 1 forward end 22 may slightly overlap first end 3. Depending upon the application forward end 22 may not overlap first end 3. In general the higher the pressure drop that flow regulator 100 needs to control the smaller the opening 23 will be or the greater the overlap when member 6 is at its maximum forward position. Alternatively, flow regulator 100 can be designed so that (a) first end 3 is slightly larger than forward end 22, so that at the maximum forward position of movable member 6, first end 3 may slightly overlap forward end 22 or (b) the two ends are the same size and at the maximum forward position of movable member 6 the ends will fit together without overlap and there will be no opening for fluid flow into duct 1. The term "slightly larger" means that in general terms the perimeter of one element (forward end 22 or first end 3) is no more than about 0.1% to about 10% larger than the perimeter of the other element although for practical purposes, since a gap between such elements will always result in a certain amount of minimum fluid flow into duct 1, the actual extent one element is larger than another will depend on how much minimum fluid flow into the duct is required or can be permitted by the practitioner.

Figure 2:
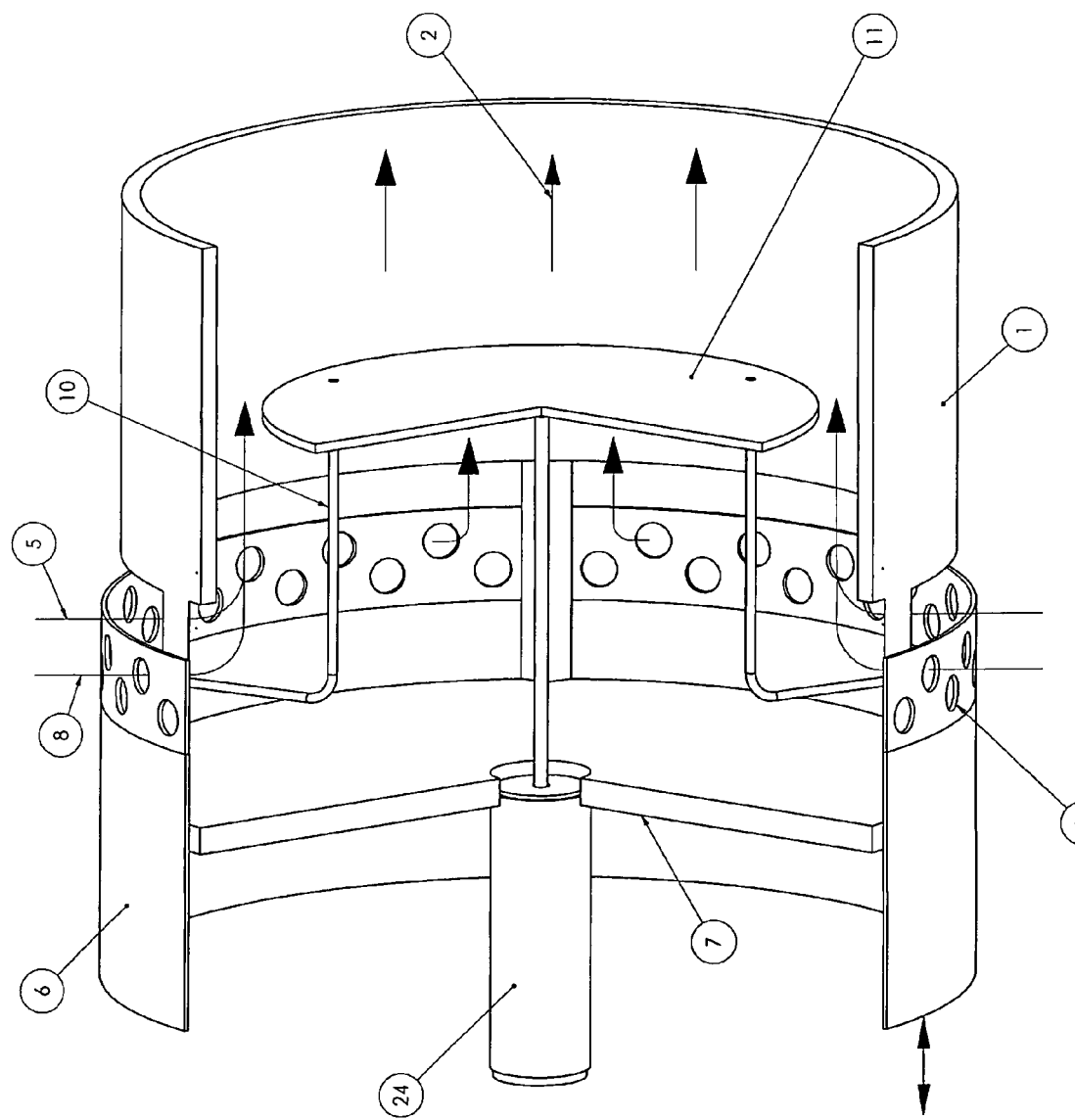
FIG. 2 shows a perspective view of another embodiment of the flow regulator which is oriented sideways for operation, also with a front portion being cut away.

FIG. 2 depicts another embodiment of the invention in which flow regulator is depicted in a basically horizontal orientation such as when used in conjunction with a burner in a power plant furnace. In FIG. 2 there is depicted reciprocal force means 24 which is used to resist or assist the movement of float 11 opposite the direction of fluid flow. The purpose of utilizing reciprocal force means 24 is to adjust the desired rate of fluid flow. Reciprocal force means 24 can be a pneumatic cylinder mounted on the bottom plate with the rod attached to the float. By adjusting the pressure/vacuum in the pneumatic cylinder, the force acting on the float will change the designed airflow rate. The pressure/vacuum in the pneumatic cylinder can be controlled by an external pressure/vacuum regulator that is connected to the pneumatic cylinder with hoses. The external pressure/vacuum regulators can either be controlled manually or automatically from a computer control system that is monitoring the overall process. This is advantageous at cement plants since the total cooling air can be adjusted to match the clinker production, clinker temperature and/or ambient temperature. Also the airflow rate in specific regions of the clinker cooler can be adjusted to match regional clinker conditions. Other constant force devices such as constant force solenoids, linear motors, hydraulic cylinders, constant force springs, or removable weights can be used. Suitable actuators may have internal sensors and if necessary power supplies to automatically respond without an external signal. Another advantage of using an actuator is that the designed flow rate is not limited to a fixed number of designed values. Theoretically, the designed flow rate is only limited by the resolution of the force produced by the actuator. Another advantage is that the basic design of the flow regulator would remain the same, (i.e. the dimensions of float 11, duct 1, and movable member 6 would remain the same), and only the force produced by the actuator would have to be changed to change flow rates. Another advantage of using a constant force actuator is that the orientation of the flow regulator does not have to remain vertical as long as the constant force actuator resists the drag force across the float.

In addition, the upper (most forward) section of member 6 can be perforated (as shown at 9) to allow another pathway for fluid flow into the duct via the direction as generally shown by arrow 8. Alternatively, member 6 can be comprised of a porous material. Although only perforations in an upper section is depicted, the perforations or porosity can extend a portion of or the entire length of member 6, so long as the degree of perforations or porosity progressively decreases down the length of member 6 toward end 21, to thereby provide increasing pressure drop as member 6 moves upward. Having a perforated or porous movable member 6 is utilized for stability in certain applications when member 6 is near its maximum forward position.

Figure 3:
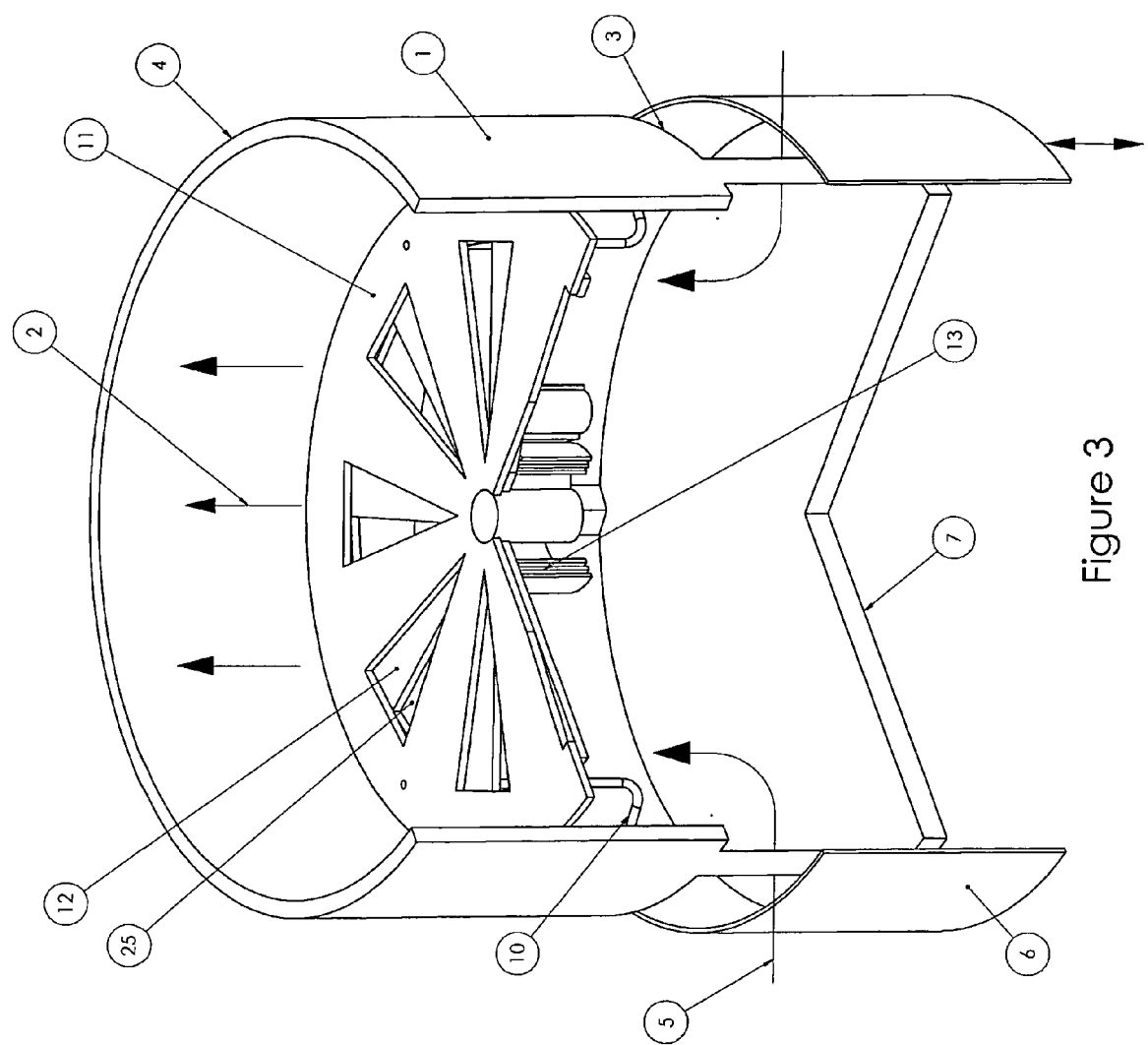
FIG. 3 shows a perspective view of a third embodiment of the flow regulator, also with a front portion being cut away.

One method of altering or predetermining the flow of fluid through duct 1 is by varying the cross sectional area of float 11 that is impacted by the fluid. This can be done by changing floats within a flow regulator, obviously during down periods for the relevant equipment such as a clinker cooler. FIG. 3 depicts an alternative solution in which the cross sectional area of float 11 impacted by fluid is adaptable to be changed during operation of flow regulator 100. Float 11 has openings 25 therein through which fluid may pass. The size of openings 25 may be varied by rotating damper or plate 12 which is located directly under float 11. At one position of the rotation of plate 12 openings 25 are completely open, and plate 12 can be further rotated to gradually reduce the size of opening 25 or to close them entirely to fluid flow. The rotation of plate 12 can be controlled by a bimetallic coil 13 so that the float area changes depending upon the temperature of the fluid through the regulator. The total length, materials of construction and thickness of the bimetallic element are selected to provide the desired increase or decrease in float area for a given temperature. One end of the bimetallic element 13 is fixed to float 11 and the other end is attached to damper 12. The geometry of damper 12 and displacement is dictated by the float area adjustment required, which is a function of the degree of compensation required over the specified temperature range.

The concept shown in FIG. 3 may be expanded to use bimetallic elements of differing geometry, dampers of different geometry and other means of retaining the damper on the float's surface. The concept shown in FIG. 3 is not limited to bimetallic elements. Other materials or mechanisms that change significantly in length/shape over temperature ranges or other selected parameters may be used.

The rotation of damper 12 can also be brought about by, for example, a stepper motor (not shown) connected to a power source which is controlled by a internal sensor or a receiver system designed to receive a signal from an external control system. The signal can be sent either wirelessly or through small wires that don't adversely affect the operation of the flow regulator As indicated, only a single characteristic such as the reciprocal force acting on the float assembly or the float area needs to be changed to achieve the desired fluid flow rate; where as most prior art flow regulators need to modify multiple characteristics simultaneously. An example where it is advantageous to control fluid flow rates during the operation of the device is the need to control the air flowing through over-fired air ports in a furnace at a power plant as the fuel mass flow rate into the furnace changes.

Another example is that it would be advantageous to reduce the cooling air into a clinker cooler as the ambient air temperature changes. Therefore, if two of the variables in the present invention's flow regulator are held constant, the airflow rate can be changed by simply changing the third variable. This can be done, for example, by simply changing the float area while keeping the duct and the movable member constant. The ability to just change one variable independently of the other parameters means that in the present invention the design flow rate can change automatically in response to an external signal or automatically based upon an internal sensor. This is accomplished by adding a sensing device and actuator that can change the float area, duct 1 cross-sectional area, or constant downward force of the float/movable member assembly. The sensor can either automatically respond to its environment or receive an external signal. If desired multiple sensor/actuators can be added.

One advantage of the design of the present invention pertaining to its application in clinker coolers is that the mass flow rate of the air needed to cool the clinker is inversely proportional to the cooling air temperature. So the present invention's flow regulator can be designed to automatically reduce the airflow rate with decreasing air temperature. This is not possible with prior art flow regulators that respond only to pressure as the air temperature decreases the pressure drop across the grate assembly and clinker bed decreases for a given flow rate.

Duct 1's cross-sectional area versus height can be changed by attached a tapered rod to the inside of the duct 1. If the tapered rod is larger at the bottom and thinner at the top, then the airflow rate will increase slightly with pressure drop. Alternatively float 11 can be designed as a flat disk with a hole in the middle through which one end of a removable rod is attached. The rod will extend vertically through the duct and will be attached to the bottom plate 7. By replacing the rod with different diameters, the effective cross-sectional area of duct 1 will change. Other mechanisms or actuators that change the float area or downward force acting on the float with height will also produce a changing flow rate with pressure drop.

The flow regulator of the present invention is not limited to controlling the airflow rate through clinker coolers. It can also be applied to any device that requires controlling the fluid flowing through different paths or branches. Some applications are to control the distribution of cooling air into clinker coolers and heat exchangers; combustion air into stoker furnaces, wind boxes in pulverized coal furnaces, tertiary air ducts to a precalciner and fluidized beds; process air into baghouses and electrostatic precipitators, and conveying air into pressurized air conveyors. The flow regulator of the present invention can be used in non-air applications such as proportional controlled hydraulic valves.

The flow regulator of the present invention is shown vertically in the Figures to simplify the description of the device; however, it is not restricted to vertical operation. Further, bottom plate 7 and float 11 are shown as flat for simplicity; however, this isn't critical to the operation of the flow regulator. Both float 11 and the bottom plate 7 can be, for example, coned shaped with the apex upward. One advantage is that this will reduce dust buildup if the flow regulator is utilized in a vertical position. Another advantage to bottom plate 7 being cone shaped is that it will reduce the pressure drop of the fluid flowing above or through the movable member 6 and turning into duct 1.

What is claimed is:

1. A device for regulating fluid flow comprising
   (a) a stationary duct having a first end and a second end, said duct defining a path for fluid flow therethrough from said first end to said second end;
   (b) a movable member having a forward end essentially similarly shaped and sized to the first end of the duct, said forward end being spaced apart from said first end to form an opening through which fluid can enter the duct, with the member being movable relative to the duct between a fully retracted position where the opening is at a maximum size and a forward position at which the forward end is adjacent to said first end and the opening is at a minimum size or is closed, and all positions intermediate, wherein the movement of the member is controlled by the movement of a float located within the duct which is impacted by the flow of fluid through the duct;
   (c) a pneumatic cylinder that applies a force on the float and movable member in the direction opposite the movement of fluid through the flow regulator, said pneumatic cylinder being adjustable during the operation of the flow regulator.

2. The device of claim 1 wherein the force applied by the pneumatic cylinder is adjusted based on process parameters.

3. The device of claim 1 wherein the movable member is perforated or porous to fluid flow.

4. The device of claim 1 wherein the bottom plate is flat.

5. The device of claim 1 wherein the bottom plate is cone shaped.

6. The device of claim 1 wherein the force applied by the pneumatic cylinder is adjusted based on process parameters.

7. The device of claim 1 wherein, in response to a predetermined operational parameter, the float will remain stationary or move toward either the forward or retracted position.

8. The device of claim 7 wherein the predetermined parameter is the rate of fluid flow into the duct which, when above a predetermined amount, will cause the float to move toward the forward position and, when below said predetermined amount, will cause the float to move toward the retracted position.

* * * * *